United States Patent [19]

Hashizume et al.

[11] Patent Number: 5,115,365
[45] Date of Patent: May 19, 1992

[54] MAGNETIC TAPE CASSETTE HAVING ELASTIC PAD ELEMENT

[75] Inventors: Kenji Hashizume; Masatoshi Okamura; Haruo Shiba, all of Nagano, Japan

[73] Assignee: TDK Corporation, Tokyo, Japan

[21] Appl. No.: 517,171

[22] Filed: May 1, 1990

[30] Foreign Application Priority Data

May 2, 1989 [JP] Japan .................................. 1-51634

[51] Int. Cl.$^5$ .......................................... G11B 23/087
[52] U.S. Cl. .................................................. 360/132
[58] Field of Search ........................ 360/132; 242/199

[56] References Cited

U.S. PATENT DOCUMENTS 4,472,753  9/1984  Wulfing ............................. 360/132
4,973,012  11/1990  Hashizume et al. ............... 360/132

Primary Examiner—Robert S. Tupper
Attorney, Agent, or Firm—Oblon, Spivak, McClelland, Maier & Neustadt

[57] ABSTRACT

A magnetic tape cassette capable of effectively eliminating a variation in pressure of the elastic pad element during traveling of a magnetic tape and preventing a variation in tension of the tape, to thereby ensure stable and safe traveling of a magnetic tape. The magnetic tape cassette is so constructed that an elastic pad element which is formed into a dogleg shape is supported at the bent portion thereof on a support rod arranged in a casing and a first section of the elastic pad element extending between the support rod and one end of the pad element is arranged so as to extend substantially in the tangential direction of a tape guide roller at the position of the guide roller at which a holding portion of the elastic pad element acts on the guide roller. The first section may be arranged in proximity to the portion of the magnetic tape between the one reel and the guide roller when the holding portion is defined in such a manner as in a conventional magnetic tape cassette typically constructed.

8 Claims, 3 Drawing Sheets

MAGNETIC TAPE CASSETTE HAVING ELASTIC PAD ELEMENT

BACKGROUND OF THE INVENTION

This invention relates to a magnetic tape cassette used for a cassette driving device such as a video tape recorder or the like, and more particularly to a magnetic tape cassette which includes an elastic pad element for pressingly control a magnetic tape in a casing.

In general, a magnetic tape cassette which has been conventionally used for a cassette driving device such as a video tape recorder or the like is typically constructed in such a manner as shown in FIG. 1. More particularly, it includes a casing 100 and a pair of reels 102 which are rotatably arranged in the casing 100 and on which a magnetic tape 104 is wound. The magnetic tape 104 is repeatedly subject to delivering and winding with respect to the reels 102 while stretchedly traveling therebetween. Also, the conventional magnetic tape cassette includes an elastic pad element 106 of a plate-like shape for pressingly control the magnetic tape 104. For this purpose, the elastic pad element 106 is forced at one end thereof against a guide roller 108 through the intermediate magnetic tape 104 to elastically abut the magnetic tape against the guide roller 108 and held at the other end on the inner surface 110 of the casing. Thus, the elastic pad element 106 forces the magnetic tape 104 against the guide roller 108 to prevent loosening of the tape 104, resulting in stable traveling of the tape 104.

Unfortunately, in the typical conventional magnetic tape cassette constructed as described above, the elastic pad element 106 undergoes vigorous vibration to a degree sufficient to cause a variation in pressure of the pad element 106 acting on the tape 104, leading to disadvantages such as a variation in tension of the tape and a failure in stable traveling of the tape, as well as settling of the pad element.

SUMMARY OF THE INVENTION

The present invention has been made in view of the foregoing disadvantages of the prior art while taking notice of the fact that as a result of the inventors' careful study, the above-described disadvantages of the prior art are caused by the arrangement of the elastic pad element. More particularly, in the prior art, as shown in FIG. 1, the elastic pad element 106 is arranged so as to extend from a support 112 to a holding portion 114 of the elastic pad element 106 at which the elastic pad element 106 elastically or pressingly abuts the magnetic tape 104 against the guide roller 108. Unfortunately, the extension of the elastic pad element 106 starts at a large angle Θ approximating 90 degrees with respect to the portion of the magnetic tape traveling between the reel 102 and the guide roller 108, resulting in the elastic pad element 106 being contacted with the magnetic tape 104 at the holding portion 114 while being bent or curved. This causes the holding portion 114 of the elastic pad element 106 to be moved with the traveling of the magnetic tape 104 due to friction between the pad element 106 and the magnetic tape 104, so that the pad element 106 is deformed or deflected. When the pad element 106 is thus moved to a certain degree, the elasticity of the pad element 106 causes the holding portion 114 to be returned to the original position. The traveling of the magnetic tape 104 causes such deformation and restoration of the pad element 106 to be repeated, resulting in the pad element 106 producing vibration and settling. Also, this leads to a variation in pressure of the pad element 106 acting on the magnetic tape 104 and a variation in tension of the magnetic tape, resulting in rendering traveling of the magnetic tape unstable.

Accordingly, it is an object of the present invention to provide a magnetic tape cassette which is capable of ensuring satisfactory operation of the cassette.

It is another object of the present invention to provide a magnetic tape cassette which is capable of constantly accomplishing stable traveling of a magnetic tape.

It is a further object of the present invention to provide a magnetic tape cassette which is capable of eliminating a variation in pressure of a pad element for pressingly controlling a magnetic tape during traveling of the tape.

It is still another object of the present invention to provide a magnetic tape cassette which is capable of preventing a variation in tension of a magnetic tape to carry out stable traveling of the tape.

It is yet another object of the present invention to provide a magnetic tape cassette which is capable of effectively preventing settling of a pad element for pressingly controlling a magnetic tape.

It is a still further object of the present invention to provide a magnetic tape cassette which is capable of accomplishing the above-described objects with a simple structure.

In accordance with one aspect of the present invention, a magnetic tape cassette is provided. The magnetic tape cassette includes a casing, a pair of reels rotatably arranged in the casing, a magnetic tape wound on the reels so that it may stretchedly travel therebetween, a guide roller arranged with respect to at least one of the reels in the casing for guiding the magnetic tape, an elastic pad element arranged with respect to at least the one reel in the casing and including a holding portion defined thereon at which the elastic pad element elastically abuts the magnetic tape against the guide roller, and a support arranged in the casing for supporting the elastic pad element thereon. The support is positioned between the one reel and the guide roller and the elastic pad element includes a section extending between the support and at least the holding portion. The section of the elastic pad element is arranged so as to extend substantially in the tangential direction of the guide roller at the position of the guide roller at which the holding portion of the elastic pad element acts on the guide roller and in proximity to the portion of the magnetic tape between the one reel and the guide roller.

In accordance with another aspect of the present invention, a magnetic tape cassette is provided. The magnetic tape cassette includes a casing, a pair of reels rotatably arranged in the casing, a magnetic tape wound on the reels so that it may stretchedly travel therebetween, a guide roller arranged with respect to at least one of the reels in the casing for guiding the magnetic tape, an elastic pad element arranged with respect to at least the one reel in the casing and including a holding portion defined thereon at which the elastic pad element elastically abuts the magnetic tape against the guide roller, and a support arranged in the casing for supporting the elastic pad element thereon. The support is positioned between the one reel and the guide roller and the elastic pad element includes a section extending between the support and at least the holding portion.

The section of the elastic pad element is arranged so as to extend in proximity to the portion of the magnetic tape between the one reel and the guide roller.

In accordance with a further aspect of the present invention, a magnetic tape cassette is provided. The magnetic tape cassette includes a casing, a pair of reels rotatably arranged in the casing, a magnetic tape wound on the reels so that it may stretchedly travel therebetween, a guide roller arranged with respect to at least one of the reels in the casing for guiding the magnetic tape, an elastic pad element arranged with respect to at least the one reel in the casing and including a holding portion defined thereon at which the elastic pad element elastically abuts the magnetic tape against the guide roller, and a support arranged in the casing for supporting the elastic pad element thereon. The support is positioned between the one reel and the guide roller and the elastic pad element includes a section extending between the support and at least the holding portion. The section of the elastic pad element is arranged so as to extend substantially in the tangential direction of the guide roller at the position of the guide roller at which the holding portion of the elastic pad element acts on the guide roller.

BRIEF DESCRIPTION OF THE DRAWINGS

These and other objects and many of the attendant advantages of the present invention will be readily appreciated as the same becomes better understood by reference to the following detailed description when considered in connection with the accompanying drawings: wherein.

DETAILED DESCRIPTION OF THE PREFERRED EMBODIMENT

Figure 1:
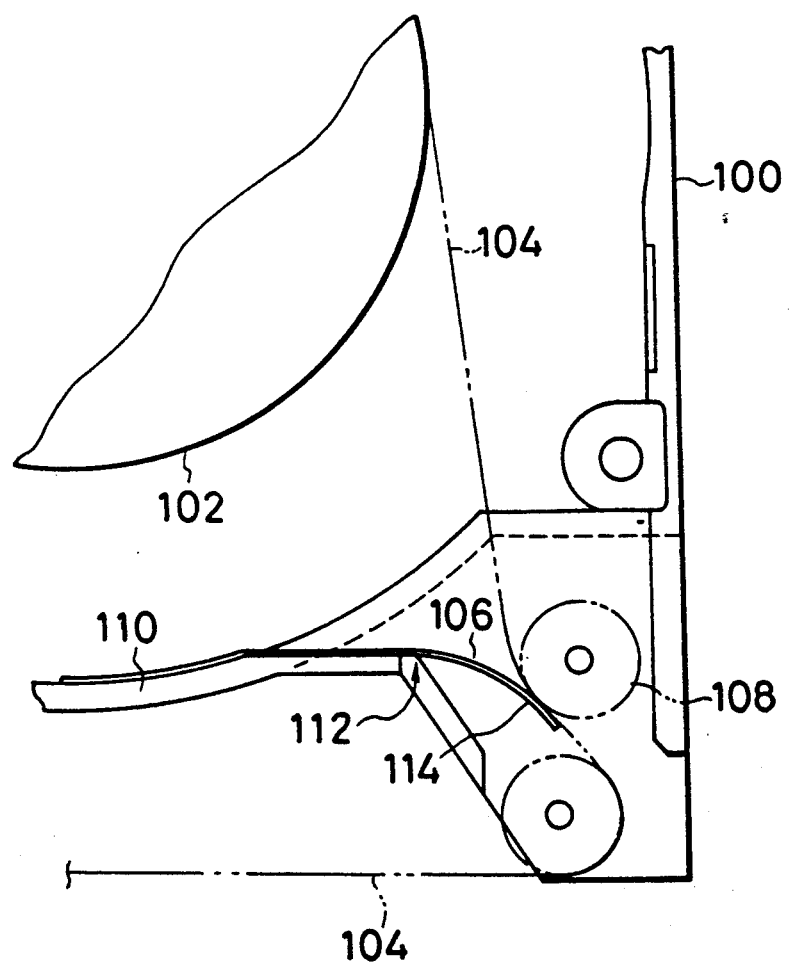
FIG. 1 is a fragmentary enlarged plan view showing an essential part of a conventional magnetic tape cassette which is constructed in a typical manner.

Now, a magnetic tape cassette according to the present invention will be described hereinafter with reference to FIGS. 2 to 4, wherein like reference numerals designate like or corresponding parts.

Figure 2:
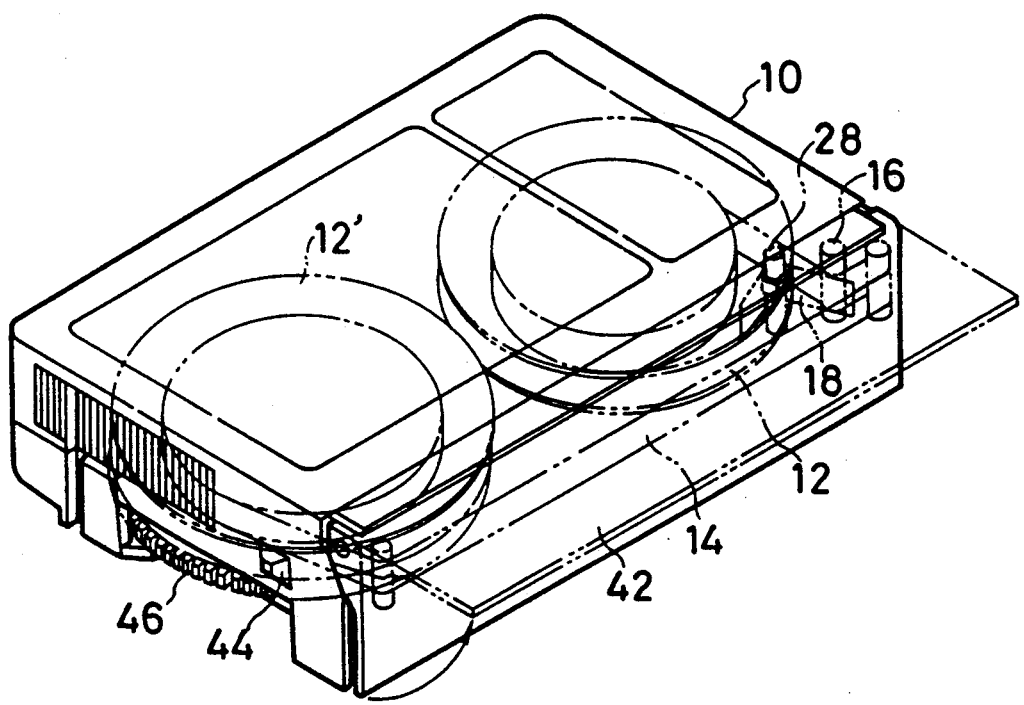
FIG. 2 is a perspective view showing an embodiment of a magnetic tape cassette according to the present invention.
Figure 3:
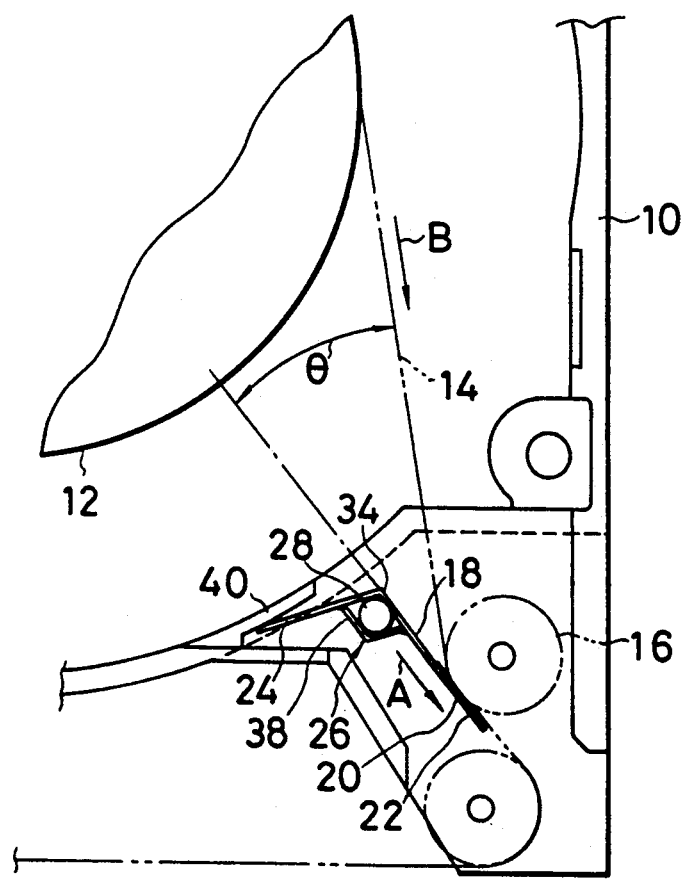
FIG. 3 is a fragmentary enlarged plan view showing an essential part of the magnetic tape cassette shown in FIG. 2.
Figure 4:
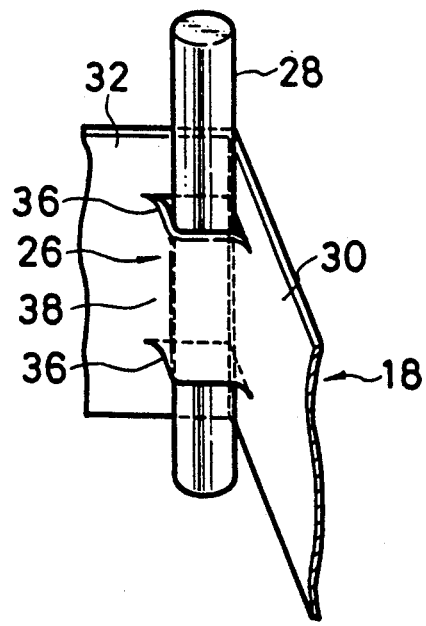
FIG. 4 is a fragmentary perspective view showing the arrangement of an elastic pad element on a support.

FIGS. 2 to 4 illustrate an embodiment of a magnetic tape cassette according to the present invention. A magnetic tape cassette of the illustrated embodiment generally includes a casing 10, a pair of reels 12 and 12' rotatably arranged in the casing 10, a magnetic tape 14 wound on the reels 12 and 12' so that it may stretchedly travel between both reels 12 and 12', at least one guide roller 16 for guiding the magnetic tape 14 and an elastic pad element 18 having a holding portion 20 at which the pad element 18 elastically or pressingly abuts the magnetic tape 14 against the guide roller 16. In the illustrated embodiment, the holding portion 20 is defined on a side of one end or distal end 22 of the elastic pad element 18. However, the holding portion 20 may be defined on the one end or distal end 22 itself. The elastic pad element 18 is held at the other end or proximal end 24 thereof on the inner surface of the casing 10. Also, in the illustrated embodiment, the guide roller 16 is arranged only on the side of the reel 12.

The elastic pad element 18 is supported at the supported section 26 thereof on a support 28 vertically provided in the casing 10 and positioned between the reel 12 and the guide roller 16. Thus, in the illustrated embodiment, the elastic pad element 18 includes a first section 30 arranged between the supported section 26 of the elastic pad element 18 supported on the support 28 and its one or distal end 22 and a second section 32 arranged between the supported section 26 and the other or proximal end 24. The elastic element 18 is so arranged that the first section 30 extends substantially in the tangential direction A of the guide roller 16 at the portion or position of the guide roller 16 at which the holding portion 20 of the elastic pad element 18 acts on the guide roller 16 or elastically abuts the magnetic tape 14 against the guide roller 16. In the illustrated embodiment, the holding portion 20 is defined in proximity to the bottom left-hand portion of the guide roller in FIG. 3 as in such a typical conventional magnetic tape cassette as shown in FIG. 1 because the direction in which the tape is delivered from the guide roller 16 is substantially the same as that in the conventional cassette, so that the first section 30 extends from the support 28 to the one end 22 in the tangential direction A of the guide roller 16 at the holding portion 20 and in proximity to the portion of the tape 14 traveling between the reel 12 and the guide roller 16 an a direction indicated at an arrow B or in a manner to define a small angle θ approximating 0 degree rather than 90 degrees with respect to the portion of the magnetic tape traveling in the direction of the arrow B. Thus, in the present invention, the position of the holding portion 20 is determined depending upon at least one of the position of the guide roller 16 at which the magnetic tape 14 is delivered from the guide roller 16 and the direction in which the magnetic tape 14 is delivered from the guide roller 16. For example, when the magnetic tape 14 is outward horizontally delivered from the lowermost portion or position of the guide roller 16 in the right-hand direction in FIG. 3, the first section 30 is arranged so as to extend in the horizontal direction while defining the holding portion 20 at the lowermost portion of the guide roller 16.

In the illustrated embodiment, the elastic pad element 18 is formed of an elastic material into an elongated plate-like shape and bent at a bent portion 34 thereof defined along the width direction thereof into a substantially dogleg shape and arranged through the support 28 in the casing 10 in such a manner as shown in FIG. 4. In the illustrated embodiment, the support 28 comprises a rod vertically arranged in the casing 10. The elastic pad element 18 is formed at the bent portion 34 with a pair of cuts or notches 36 extending in the horizontal or longitudinal direction thereof and spaced from each other at a suitable interval in the vertical or width direction thereof. When the elastic pad element 18 is bent at the bent portion 34 into a dogleg shape, the notches 36 each are opened into a rectangular shape to define a rod fit-in section 38 between the notches 36 in which the support 28 rod is partially fitted as shown in FIG. 4, so that the elastic pad element 18 may be supported on the rod 28, resulting in at least the first section 30 of the elastic pad element 18 being pivotally moved about the rod 28. In the illustrated embodiment, the other end 24 of the elastic pad element 18 is fixedly mounted on a rib 40 of the casing 10.

The elastic pad element 18 may be provided at the holding portion 20 with a protective material for ensuring safe traveling of the magnetic tape 14. The protective material may be formed into a sheet-like shape and applied to the elastic pad element by adhesion or the like. The protective material may be selected from the group consisting of, for example, a felt material and a lubricant synthetic resin material such as tetrafluoroethylene, ultra-high-molecular-weight polyethylene, ultra-high-molecular-weight polyethylene foam, graphite tetrafluoroethylene polyester, or the like. Such construction permits the magnetic tape to smoothly travel without being damaged. Also, this permits the tension of the magnetic tape and the pressure of the elastic pad element 18 acting on the magnetic tape to be rendered significantly uniform. Alternatively, the one end 22 of the elastic pad element 18 may be subject to any suitable processing. This may be accomplished by covering the end 22 with a round cap of a lubricant material or coating it with a lubricant material.

In FIGS. 2 to 4, reference numerals 42, 44 and 46 designate a front lid, an projection for operating the front lid 42, and a plate member for preventing idling of the reels 12', respectively.

The elastic pad element 18, as described above, is formed with the fit-in section 38 though which it is pivotally supported on the support 28. Also, the pad element 18 is held at the other end 24 on the casing 10 and engaged at the holding portion 20 which is defined in proximity to or at the one end 22 of the element 18 with the magnetic tape 14 on the tape guide roller 16 to pressingly abut the tape 14 against the guide roller 16 while interposedly supporting it between the holding portion 20 and the guide roller 16, resulting in rendering the pressure of the pad element acting on the magnetic tape rendered uniform to a degree sufficient to ensure stable and safe traveling of the magnetic tape. Also, the arrangement of the elastic pad element 18 on the support 28 can be readily carried out because it is merely required to insert the support 28 through the fit-in section 38 of the pad element 18 formed through the notches 36 by merely bending the pad element 18 along the bent portion 34 of the pad element, resulting in the productivity of the cassette being significantly improved.

As can be seen from the foregoing, the magnetic tape cassette of the present invention is so constructed that the support is arranged in the casing for supporting the elastic pad element thereon and the section of the elastic pad element extending between the support and at least the holding portion is arranged so as to extend substantially in the tangential direction of the guide roller at the position of the guide roller at which the holding portion of the elastic pad element acts on the guide roller. Also, the section may be arranged in proximity to the portion of the magnetic tape between the one reel and the guide roller. Such construction of the present invention effectively eliminates a variation in pressure of the elastic pad element during traveling of the tape and prevents a variation in tension of the magnetic tape. Also, it effectively prevents settling of the pad element for pressingly controlling the magnetic tape. Thus, the present invention carried out stable and safe traveling of the magnetic tape, to thereby ensure satisfactory operation of the cassette.

While a preferred embodiment of the present invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A magnetic tape cassette comprising:
   a casing;
   a pair of reels rotatably arranged in said casing;
   a magnetic tape wound on said reels so that it may stretchedly travel therebetween;
   a guide roller arranged with respect to at least one of said reels in said casing for guiding said magnetic tape;
   an elastic pad element arranged with respect to at least said one reel in said casing and including a holding portion defined thereon at which said elastic pad element elastically abuts said magnetic tape against said guide roller; and
   a support arranged in said casing for supporting said elastic pad element thereon;
   said support being positioned between said one reel and said guide roller;
   said elastic pad element including a section extending between said support and at least said holding portion;
   said section of said elastic pad element being arranged so as to extend substantially in the tangential direction of said guide roller at the position of said guide roller at which said holding portion of said elastic pad element acts on said guide roller and in proximity to the portion of said magnetic tape between said one reel and said guide roller,
   wherein said elastic pad element is pivotally supported on said support so that said section of said elastic pad element may be pivotally moved about said support.

2. A magnetic tape cassette as defined in claim 1, wherein said holding portion of said elastic pad element is determined depending upon at least one of the position of said guide roller at which said magnetic tape is delivered from said guide roller and the direction in which said magnetic tape is delivered from said guide roller.

3. A magnetic tape cassette as defined in claim 1, wherein said holding portion of said elastic pad element is formed on this side of the distal end of said elastic pad element.

4. A magnetic tape cassette as defined in claim 1, wherein said holding portion of said elastic pad element is formed at the distal end of said elastic pad element.

5. A magnetic tape cassette as defined in claim 1, wherein said elastic pad element is provided at said holding portion thereof with a protective material for ensuring safe traveling of said magnetic tape.

6. A magnetic tape cassette comprising:
   a casing;
   a pair of reels rotatably arranged in said casing;
   a magnetic tape wound on said reels so that it may stretchedly travel therebetween;
   a guide roller arranged with respect to at least one of said reels in said casing for guiding said magnetic tape;
   an elastic pad element arranged with respect to at least said one reel in said casing and including a holding portion defined thereon at which said elastic pad element elastically abuts said magnetic tape against said guide roller; and a support arranged in said casing for supporting said elastic pad element thereon;

said support being positioned between said one reel and said guide roller;

said elastic pad element including a section extending between said support and at least said holding portion;

said section of said elastic pad element being arranged so as to extend in proximity to the portion of said magnetic tape between said one reel and said guide roller, wherein said elastic pad element is pivotally supported on said support so that said section of said elastic pad element may be pivotally moved about said support.

7. A magnetic tape cassette comprising:

a casing;

a pair of reels rotatably arranged in said casing;

a magnetic tape wound on said reels so that it may stretchedly travel therebetween;

a guide roller arranged with respect to at least one of said reels in said casing for guiding said magnetic tape;

an elastic pad element arranged with respect to at least said one reel in said casing and including a holding portion defined thereon at which said elastic pad element elastically abuts said magnetic tape against said guide roller; and a support arranged in said casing for supporting said elastic pad element thereon;

said support being positioned between said one reel and said guide roller;

said elastic pad element including a section extending between said support and at least said holding portion;

said section of said elastic pad element being arranged so as to extend substantially in the tangential direction of said guide roller at the position of said guide roller at which said holding portion of said elastic pad element acts on said guide roller, wherein said elastic pad element is pivotally supported on said support so that said section of said elastic pad element may be pivotally moved about said support.

8. A magnetic tape cassette comprising:

a casing;

a pair of reels rotatably arranged in said casing;

a magnetic tape wound on said reels so that it may stretchedly travel therebetween;

a guide roller arranged with respect to at least one of said reels in said casing for guiding said magnetic tape;

an elastic pad element arranged with respect to at least said one reel in said casing and including a holding portion defined thereon at which said elastic pad element elastically abuts said magnetic tape against said guide roller; and a support arranged in said casing for supporting said elastic pad element thereon;

said support being positioned between said one reel and said guide roller;

said elastic pad element including a section extending between said support and at least said holding portion;

said section of said elastic pad element being arranged so as to extend substantially in the tangential direction of said guide roller at the position of said guide roller at which said holding portion of said elastic pad element acts on said guide roller and in proximity to the portion of said magnetic tape between said one reel and said guide roller, wherein said support comprises a rod;

said elastic pad element is formed into an elongated plate-like shape;

said elastic pad element is provided with a bent portion defined so as to extend in the width direction thereof;

said elastic pad element is formed at said bent portion with a pair of notches extending in the longitudinal direction thereof and spaced from each other in the width direction thereof; and said elastic pad element is bent at said bent portion into a dogleg shape to form a fit-in section in which said support is partially fitted, resulting in being pivotally supported on said support.

* * * * *